United States Patent [19]
Church et al.

[11] Patent Number: 6,055,161
[45] Date of Patent: Apr. 25, 2000

[54] SWITCHING TYPE POWER SUPPLY FOR ARC WELDING

[75] Inventors: Larry L. Church, Jefferson; Lifeng Luo, Solon, both of Ohio

[73] Assignee: Lincoln Global, Inc., Cleveland, Ohio

[21] Appl. No.: 09/290,044

[22] Filed: Apr. 12, 1999

[51] Int. Cl.[7] ........................... H02M 3/335; H02M 3/18
[52] U.S. Cl. ................................. 363/22; 363/21; 363/56
[58] Field of Search .................................. 363/22, 26, 71, 363/21, 56; 323/251, 334; 307/270; 361/91, 159

[56] References Cited

U.S. PATENT DOCUMENTS

| | | | |
|---|---|---|---|
| 4,403,269 | 9/1983 | Carrol | 361/91 |
| 5,636,114 | 6/1997 | Bhagwat et al. | 363/79 |

OTHER PUBLICATIONS

Snubber Circuits: Theory, Design and Application—Philip C. Todd—May 1993.

*Primary Examiner*—Peter S. Wong
*Assistant Examiner*—Rajnikant D. Patel
*Attorney, Agent, or Firm*—Vickers, Daniels & Young

[57] ABSTRACT

In a switching type power supply for use in an electric arc welder or plasma cutter, of the type having an output transformer with a primary winding in a series circuit DC source with a selected voltage and a switch, either single or tandem, with a conductive on state to pass a current pulse through the primary winding in a first electrical direction and a non-conductive off state disconnecting the DC voltage source from the winding and a large filter capacitor across the DC input voltage source, the improvement comprising: a snubber network for transferring energy due to the leakage inductance of the primary winding to the filter capacitor when the switch is shifted from the on state to the off state where the snubber network includes a storage capacitor with a diode controlled resonant charging circuit so the winding is in a tank circuit with the storage capacitor to charge the storage capacitor in a charging cycle when the switch shifts from the on state to the off state and a diode controlled discharging circuit where the storage capacitor is in series with the winding and the filter capacitor to discharge the storage capacitor into the filter capacitor when the winding reverses polarity.

42 Claims, 7 Drawing Sheets

SWITCHING TYPE POWER SUPPLY FOR ARC WELDING

The present invention relates to an improved switching type arc welder or plasma cutter with an improved snubber network which transfers leakage energy from the output transformer primary winding to the input power supply during the switching sequence.

INCORPORATION BY REFERENCE

The invention relates to a novel passive snubber network that is non-dissipative for combination with high energy rapid switching power supplies, such as inverters. Although this type of snubber network is not known, snubber networks in general of the passive, active, dissipating and non-dissipating are well known and used extensively in switching circuits. The concept of snubbers is found in the May 1993 article by Philip C. Todd entitled *Snubber Circuits: Theory, Design and Application*. This 1993 article is incorporated by reference herein as background information so that the details of various electrical characteristics of snubber networks need not be repeated. Snubber technology is well developed and known to engineers in the electrical industry.

BACKGROUND OF INVENTION

In arc welders and plasma cutters, it has become common practice to use switching power supplies of the inverter type. An output transformer includes two separate sections of the primary winding, each section of which is alternately provided with current pulses in opposite directions to create an AC output rectified and used for electric arc welding or plasma cutting. Various types of inverters are employed, such as a push pull inverter wherein the primary winding is divided into two sections and a single DC power supply is used to switch current pulses in one direction through one section of the primary and then in the opposite direction in another section of the primary. By alternately switching the current pulses through the primary sections, AC current is developed. Such push pull type inverters are operated at a frequency of at least 20 kHz with a single switch for each primary used for creating opposite polarity current pulses in the sections of the primary winding. The electric arc welding and plasma cutting requires high energy with wattage well over 500–1,000 watts. Indeed, inverters used as the power supply for electric arc welding and plasma cutters often have input currents well over 60 amperes and voltages over 200 volts. When using such high energy switching type power supplies, it is the practice of The Lincoln Electric Company in Cleveland, Ohio, a leading manufacturer of electric arc welders and plasma cutters, to provide an inverter with one primary winding section connected to a DC first power source and the other winding connected to a second DC power source. These power sources can be connected in series or in parallel to cover the range of potential voltages, i.e. 200–275 volts. When using such high energy inverters for creating the AC primary signal, two switches are operated in unison for each of the two primary winding sections. One set of switches is closed to create a current pulse in one direction through one section of the primary. Thereafter, a second set of two switches is closed to create a current pulse in the opposite direction to the other section of the primary winding. Each of these sections is driven by its own DC voltage source having an input filter capacitor that maintains the input terminals of both switching networks at a fixed voltage. To allow voltage balancing and interconnecting of the two primary sections, each primary section is clamped to its input power supply by a clamping diode connecting the bottom of the section to the positive terminal of the power supply. The top of the winding section is clamped to the ground of negative terminal of the power supply. Each of the switches in the inverter, which operate at a high rate exceeding about 20 kHz, is provided with a dissipating snubber including a capacitor and resistor in series and connected across the switch in parallel. High voltages caused by the transformer leakage inductance during the opening of the switches contain energy which is clamped to the power supply and is also dissipated around the switches to reduce the necessary rating of the individual switches. These standard snubbers are large, heavy and dissipate a large amount of heat to decrease the efficiency of the electric arc welder or plasma cutter. Substantial research and development has been directed to reducing the size of these snubbers and providing more effective snubbing networks for decreasing the size, cost and weight of the snubbers necessary to protect the high speed switches demanded for power supplies used in the welding industry. However, the only snubbers which have had the capability of absorbing the energy created by high energy power supplies have been the dissipating, passive type. Such snubbers are now universally used in the welding industry.

There are a number of snubber networks which employ non-dissipative voltage snubbers; however, they have been heretofore used for low power devices generally less than about 200 watts. In addition, these snubbers require the use of relatively large inductors to polarize the snubber network. For this reason, there has been no impetus for, or knowledge of, employing passive, non-dissipative snubber networks in high energy power supplies of the type needed for electric arc welding and plasma cutting.

THE INVENTION

The invention is particularly applicable for use in a high energy power supply used for electric arc welding and it will be described with particular reference thereto; however, the invention is much broader and may be used for high energy power supplies, such as plasma cutters. In recent years, power supplies of the type used for electric arc welding have been improved at an accelerated pace with the more recent power supplies including two stage inverters with four switches. A current pulse is switched through one section of the primary winding of the output transformer and then an opposite polarity current pulse is switched through the other section of the primary winding. These current pulses are opposite polarity to create an AC input to the output transformer whereby the output of the transformer is rectified prior to use in electric arc welding. These inverters are operated at high speeds, exceeding about 20 kHz switching rates; therefore, there is a need for dissipating the energy created in the primary winding immediately upon opening the one set of switches to terminate a current pulse awaiting the current pulse from the opposite stage of the inverter. The present invention is applicable to this type of high speed switching power supply for welders and will be described with particular reference to this two stage architecture for the inverter; however, it is appreciated that a push-pull type of inverter with a single DC power supply with only two switches can be modified to employ the present invention, as can a full bridge inverter with two sets of tandem switches.

The invention relates to an improvement in an existing inverter type welder or cutter, which improvement avoids the necessity of a large snubber for each of the four switches used in the inverter. In the invention, the leakage inductance energy of the primary winding section is stored in two parallel charged capacitors in a unidirectional charging circuit which forms a tank circuit with the one primary winding section of the transformer. The winding section of the transformer is the resonant element of the snubber to force energy from the winding section when the switches open to the input power supply in a passive snubber network. In the invention, when using the two stage, four switch inverter, each stage utilizes two storage capacitors and four diodes for each section of the primary windings. By using the present invention, the snubber network clamps voltage overshoots when the switches are opened by transferring the energy caused by transformer leakage inductance to the two parallel connected capacitors or to the input capacitor. In a dissipating snubber, such energy would be transferred from the capacitors through a resistor or the switches themselves on reclosure for heat dissipation. In some non-dissipative snubbers the energy from a capacitor is transferred back to the input or forwarded to the output, through a resonant element, such as an added inductor in the snubber network. Such networks are not used in arc welding and plasma cutting. In accordance with the invention, the leakage inductance of the transformer itself is used as the resonant element so as to fully discharge the two capacitors and move the energy back into the input capacitor. The snubber network operates by charging two capacitors in parallel to absorb the energy from a primary section when one set of switches is turned off and the voltage across the primary section is self reversed. This charging cycle is allowed by diodes in series with the storage capacitors that are forward biased to provide parallel circuits for charging the two storage capacitors. In this charging cycle, the two diodes allow transfer of energy to the parallel capacitors until the primary winding section forming a tank circuit with the capacitors starts to oscillate in the reverse direction. When this occurs, the diodes in series with the storage capacitors are reversed biased and the capacitors are fully charged to the extent they can be charged during the charging cycle. The energy from the windings has been transferred to the two storage capacitors. When the winding section starts to decay in voltage, the charged storage capacitors are placed in series in a circuit including the transformer winding and the input filter capacitor, which capacitor is quite large. At first, the storage capacitors tend to distribute energy both to the winding and to the input capacitor; however, when the winding section again reverses polarity, i.e. rereverses, in its oscillation to the point of zero current flow, all energy is discharged from the storage capacitors and the winding to the input capacitor. At this time there is no current flow in the circuit and the capacitors are fully discharged. Since there is no current flow, the diodes in the discharge path to the input capacitor are reverse biased and the storage capacitors are at zero voltage awaiting the next charging cycle. All the energy discharged from the transformer leakage inductance to the storage capacitor is transferred to the input filter capacitor. The charging and discharging of the two storage capacitors is determined by the resonant frequency of the winding section and charging capacitors. The capacitors are quite small so the resonant frequency is high and is substantially greater than the switching frequency of the two switches. Thus, the charge and discharge cycles occurring upon opening of the set of switches requires a time less than the time the switches are in the non-conductive, or off, condition. If the resonant frequency of the charging circuit is low, the capacitors would not fully discharge before the switches are again rendered conductive by being turned on. This is a general discussion of the invention as applied to the two stage high speed inverter now being used for electric arc welding and plasma cutting.

As a general statement of the invention, it involves an improvement in a switching type power supply for use in an electric arc welder or plasma cutter, which power supply comprises an output transformer with a primary winding in a series circuit including a DC source having a selected voltage and a switch. In the preferred embodiment, tandem switches constitute the switch, which switch, either single or tandem, has a conductive on state, where current pulse through the primary winding in a first electrical direction and a non-conductive off state disconnecting the DC voltage source from the winding and a large filter capacitor across the DC input voltage source. The filter is a voltage source. The switch, either single or tandem, is operated at a radio frequency with a known period for the off state. This type of power supply is improved by using an integrated snubber network that employs the output transformer primary winding as the resonant element of the non-dissipative snubber. The snubber network transfers energy due to the leakage inductance of the primary winding to the filter capacitor when the switch is shifted from the on state to the off state. This improved snubber network includes a storage capacitor, in the preferred embodiment two separate capacitors, with a diode controlled resonant charging circuit wherein the winding is a tank circuit with the storage capacitor or capacitors to charge the storage capacitor or capacitors in a charging cycle. When the switch, single or tandem, shifts from the on state to the off state, the winding has a first electrical polarity to maintain current flow. The snubber of the present invention includes a diode control discharging circuit including some of the charging circuit components, but being separate from the charging circuit. The discharge circuit places the storage capacitor, one or two capacitors, in series with the winding and the filter capacitor to discharge the storage capacitor into the filter capacitor when the primary winding of the transformer reverses its polarity. The time for a successive charge cycle and discharge cycle is substantially less than the known period when the tandem or single switch is non-conductive and awaiting creation of the next current pulse. In accordance with the invention, the switching frequency is less than the resonant frequency of the charging circuit for the storage capacitors. However, the resonant circuit merely reverses current flow by decaying of the voltage on the winding. This causes immediate termination of the charging of the capacitors and initiates discharging of the capacitors. This discharge rate is determined by series capacitors and the charging rate is determined by parallel capacitors.

By using the present invention, no energy is lost during the snubbing operation. Less heat is generated in the welder or cutter. No resistor is needed in the snubber network so there is reduction in the space on the printed circuit boards, which space is always at a premium. The novel network is a relatively simple circuit that can be applied to existing inverters used in arc welding and plasma cutting and does not require any resistor or added inductor. There is very little EMI during the switching operation and noise has been found to be relatively non-existent.

In accordance with another aspect of the present invention the storage capacitor, either single or tandem, is charged to a voltage that creates a discharge voltage substantially greater than the input voltage of the power supply. This allows the transfer of energy from the winding to the large filter capacitor at the input of the inverter. In the preferred embodiment of the invention, the storage capacitor is a dual capacitor set where two capacitors are connected in parallel and then in series with diodes so that the charging of the storage capacitors is in parallel and the discharging is in series. By utilizing a small capacitor and a diode clamp from the input voltage to the storage capacitor, the capacitors are charged to the input voltage. When the capacitors are placed in the discharge circuit in series, they have a voltage twice as high as the voltage across the input filter capacitor. This causes a rapid transfer of energy from the storage capacitors to the input filter capacitor, which transfer is completed when the capacitors swing back to $V_{in}$ to prevent any more current flow in the discharge cycle. By causing the capacitive reactance in the charging cycle to create a voltage level that is approximately twice the input voltage, the discharge of energy from the capacitor is based upon high voltage substantially greater than the input voltage. The discharge of the capacitors in series provides a forward voltage drop across the winding and the voltage to overcome the filter capacitor. The voltage across the winding is needed to ramp up the discharge current since the leakage inductance of the transformer is also in the discharge loop. The double voltage concept is obtained, in the preferred embodiment of the invention, by charging two storage capacitors in parallel and then discharging them in series. It has been found that the same concept can be accomplished in a push-pull type inverter by a single capacitor. A capacitor is charged by the total length of the primary winding even though the power supply drives only half of the primary winding. In this fashion, a double voltage is captured on a single capacitor during the charging cycle of the invention. Thus, a voltage twice the level of the input voltage is obtained by a single capacitor which is discharged in series and uses the present invention. This double voltage is automatically obtained in the preferred embodiment with the capacitors charged in parallel to the input voltage and then discharged in series.

In accordance with another aspect of the present invention, the storage capacitors have a low capacitance of less than about 1.0 μF and the filter capacitor has a capacitance of at least about 1000 μF. The storage capacitors can thus be charged to the input voltage during a very short time while the switch is non-conductive. The large capacitance of the input capacitor is used for filtering and an easy receptor of energy from the storage capacitors. The storage capacitors in the preferred embodiment have a capacitance which is relatively low so that they are charged to the input voltage with excess energy clamped to the input capacitor. In this manner, the two capacitors are always charged to the input voltage. If these capacitors are not charged to the input voltage, the discharge voltage is not twice the input voltage. Consequently, the discharge of energy to the input capacitor is less effective. By using the present invention, the capacitors are fully discharged so that there is no dissipation of energy when the switches are subsequently closed.

In accordance with another aspect of the present invention, a two stage, high speed switching inverter is provided with an improved snubber network, as described above, with clamping of the over voltage at both sections of the primary windings so that the two stages can be connected in series or in parallel as two stage inverters are connected in the field. In this manner, by using the snubber network to improve the welder and/or plasma cutter there is no limitation on the versatility of the resulting inverter type power supply.

The primary object of the present invention is the provision of an improved inverter type power supply for electric arc welding and plasma cutting, which improvement involves the addition of integrated snubber network using the primary winding of the output transformer as the resonant element for non-dissipative transfer of switched leakage energy away from the switches.

Yet another object of the present invention is the improvement, as defined above, which improvement allows the use of a non-dissipative snubber network in a high power, high speed inverter type power supply so that no energy is lost, less heat is generated and the space, cost and complexity of the machines is decreased.

Still a further object of the present invention is the provision of an improvement, as defined above, which improvement is quite simple and can be used on existing two stage or push-pull inverter type power supplies in a manner to reduce the EMI noise and produce a clean signal during actual switching of the inverter.

Another object of the present invention is the provision of an improvement, as defined above, which improvement involves a storage capacitor in a tank circuit with the primary winding of the output transformer of an inverter as the resonant element that charges the capacitor and then immediately stops the charging cycle and initiates a discharge cycle for transferring energy into the input of the power supply. Such improvement is a substantial advance in the welding and plasma cutting technology and drastically reduces the cost of such machines, as well as the complexity of these machines.

These and other objects and advantages will become apparent from the following description taken together with the accompanying drawings.

PREFERRED EMBODIMENT OF THE PRESENT INVENTION

Figure 1:
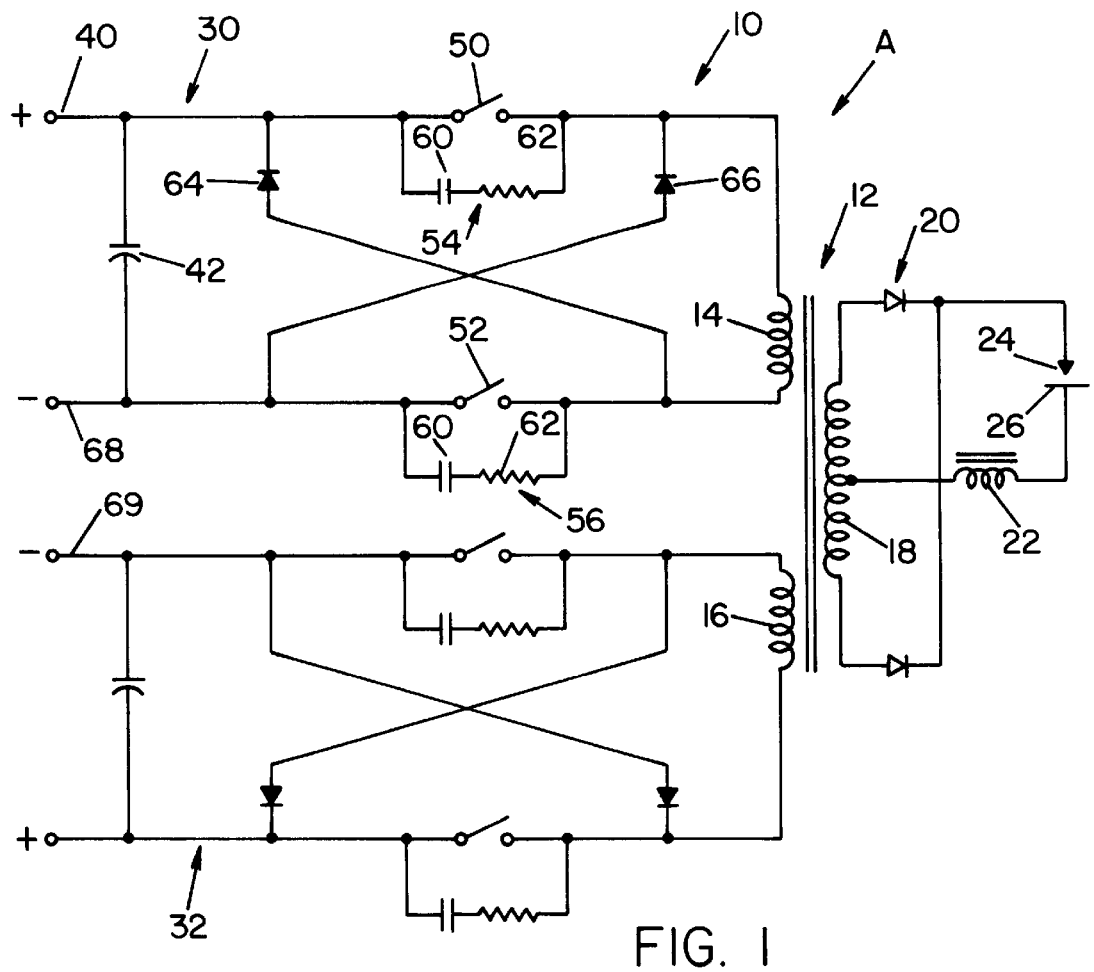
FIG. 1 is a wiring diagram of a two stage, high speed switching inverter of the type now used for electric arc welding and plasma cutting.

Referring now to the drawings wherein the showings are for the purpose of illustrating a preferred embodiment of the invention only and not for the purpose of limiting same, FIG. 1 shows a prior art electric arc welder A having an inverter type power supply 10 with an output transformer 12 comprising primary winding sections 14, 16 and a secondary winding 18 for driving an output rectifier 20. Inductor or choke 22 controls current flow across electrode 24 and workpiece 26 in accordance with standard practice. Power supply 10 includes a first stage 30 for creating current pulses in winding section 14 and a second stage 32 for creating current pulses in primary winding section 16. Since stages 30,32 are substantially the same, only stage 30 will be described in detail and this description will apply to stage 32. A DC source 40, which is normally the output of a three phase rectifier, has a large filter capacitor 42 maintained at the input voltage during operation of the switches 50, 52. These switches are operated at a rate normally equal to or greater than about 20 kHz by a standard pulse width modulator control for adjusting the output current according to the width of the pulses created by closing switches 50, 52. These tandem switches are operated in unison to fully disconnect the winding section 14 from the input during the off state. Such commercially employed welder A includes dissipating snubbers 54, 56, each snubber being a capacitor 60 in series with a resistor 62. When switches 50, 52 are opened, the voltage on the lower end of winding section 14 increases drastically to maintain the existing current flow through the section. This high current is dissipated through snubbers 54, 56 to reduce the strain and forward voltage across switches 50, 52. These switches are transistor type switches, normally IGBTs or FETs, that can be operated quite rapidly; however, the size of the switches is dictated by the amount of current and voltage experienced during the switching operation. High voltage on the bottom of winding section 14 is clamped to the input positive side of capacitor 42 by diode 64. This prevents unbounded voltage overshoots when switches 50, 52 are opened and the snubber circuit absorbs the initial surge. In a like manner, the top end of winding 14 is clamped to ground by diode 64. The same clamping procedure is used in stage 32. Consequently, stages 30, 32 can be connected in parallel for 230 DC volt operation or in series for 460 DC volt operation. By this clamping process, the system is maintained balanced. The point at terminals 68, 69 is kept balanced in the middle for the series configuration. This concept in combination with the clamping diode 64, 66 is important in standard power supply A. These features are necessary and must be obtainable when the standard power supply is modified to use the present invention. A snubber network that maintains the balancing feature as shown in FIG. 1 will retain the versatility created by the use of the two stage inverter A.

Figure 2:
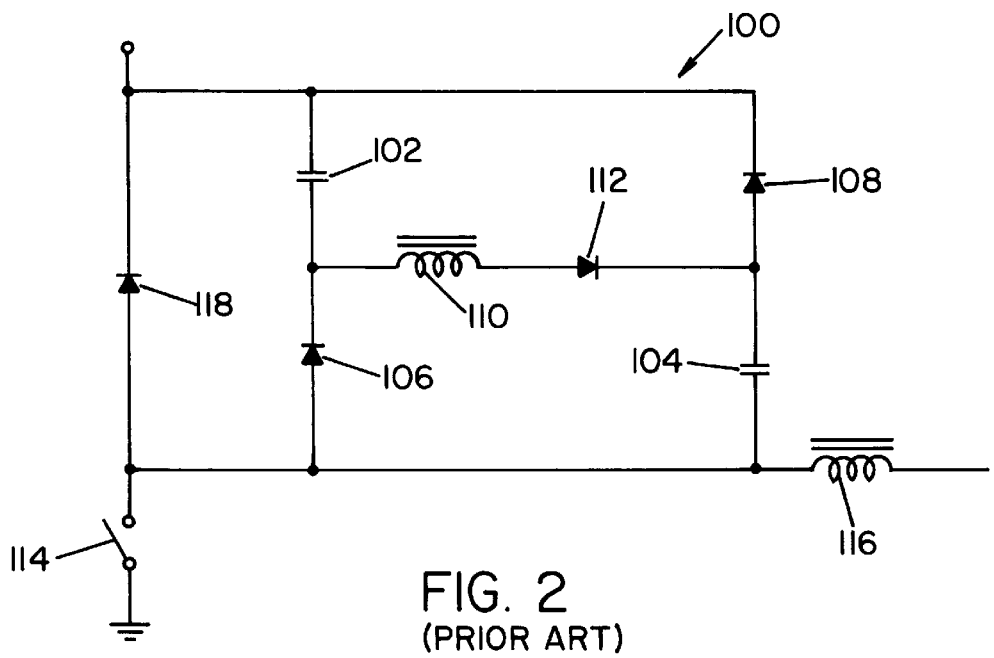
FIG. 2 is a wiring diagram of a capacitive non-dissipative snubber of the prior art and connected in a switching network, but not across the switch.

A low power, non-dissipative snubber network is illustrated in FIG. 2, wherein network 100 includes capacitors 102, 104 with blocking diodes 106, 108 in parallel circuits joined by inductor 110 and diode 112. This network 100 is used with switch 114 for a small power supply including an inductor 116 and freewheeling diode 118. In operation, the capacitors 102, 104 have generally equal values. The resonant frequency of capacitors 102, 104 and inductor 110 is substantially higher than the switching frequency of switch 114. When switch 114 is open, inductor 116 conducts through main diode 118. Capacitors 102, 104 are discharged. Snubber 100 is reset when switch 114 is closed. Diodes 106, 108 are turned off and capacitors 102, 104 apply the input voltage across inductor 110 because they are discharged. Current will flow through inductor 110 and will ring with the capacitors 102, 104 until the current through inductor 110 reaches zero. Then, the diode 112 turns off because there is no current flow. At this point, the capacitors are again charged to the input voltage and the snubber awaits an opening of switch 114. This operation is completely different from the operation of the present invention, but it is the closest prior art now known. When switches 114 turns off, all of the current from the inductor 116 flows into the two capacitors by way of the diodes 106, 108. Consequently, the capacitors are in parallel, but the capacitors have already been charged. The two capacitors control the rate of change of voltage across switch 114. Turn off dissipation by switch 114 is very small since the capacitors take the full inductor current. Thus, this prior art snubber network starts with capacitors fully charged and uses diode 112 with inductor 110 to fully charge and isolate the two capacitors. This involves a ringing of inductor 110 with the capacitors to charge the capacitors awaiting for the turn off of the switch 114. The article incorporated by reference has the circuit of FIG. 2 but its relevancy to the present invention is not admitted.

Figure 3:
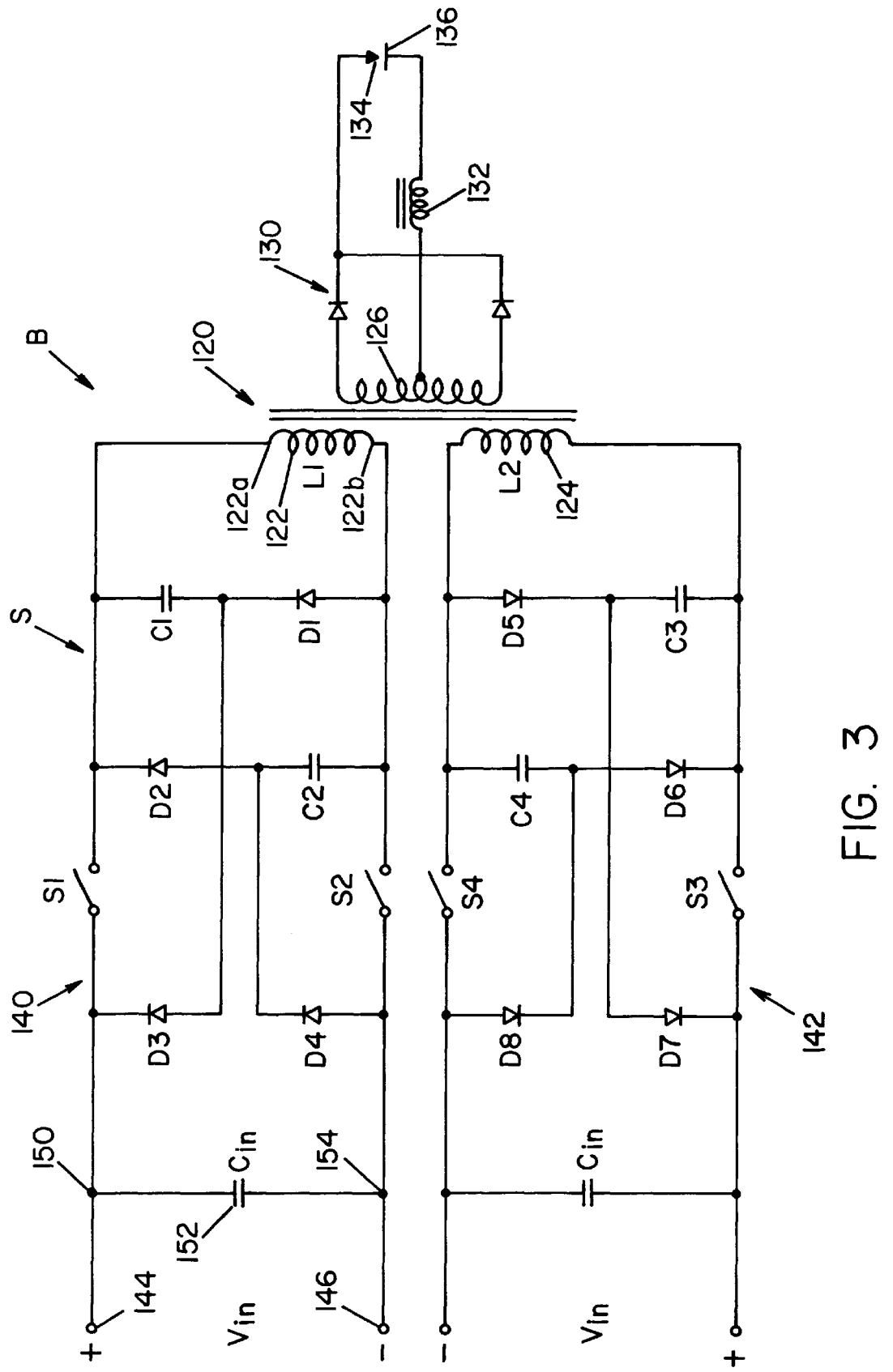
FIG. 3 is a wiring diagram of a two stage inverter using the preferred embodiment of the present invention.
Figure 4:
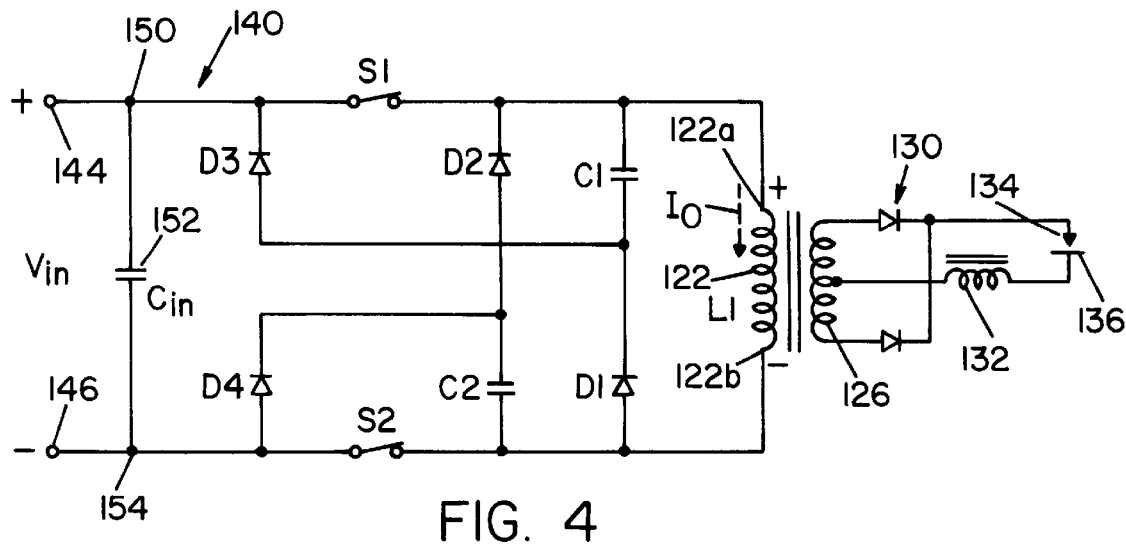
FIGS. 4, 5 and 6 are wiring diagrams, as shown in FIG. 3, describing the operating sequence for one-half of the inverter constituting the preferred embodiment of the present invention.
Figure 5:
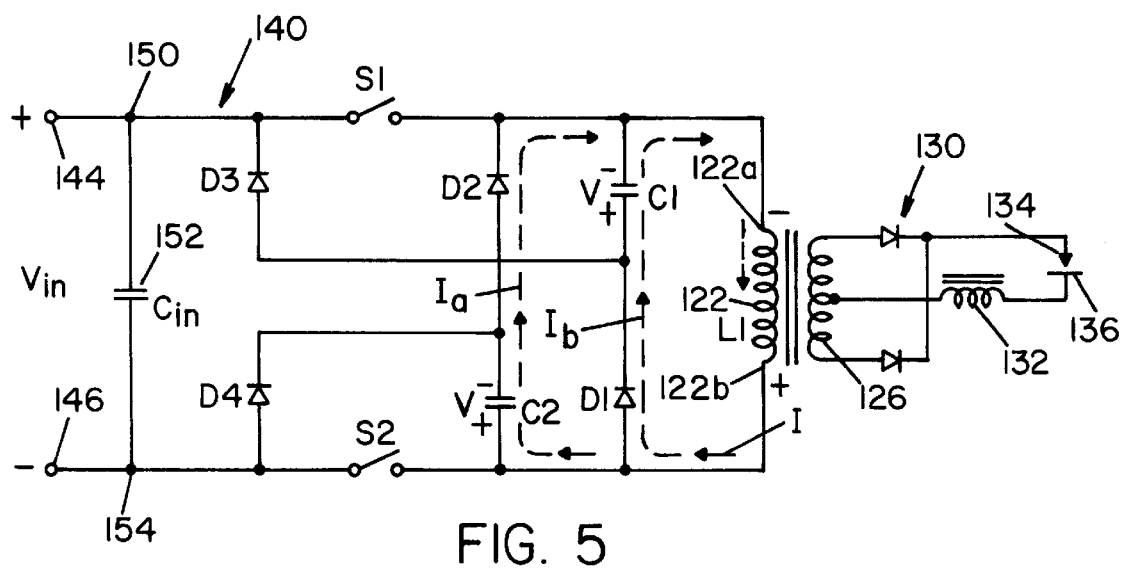
Figure 6:
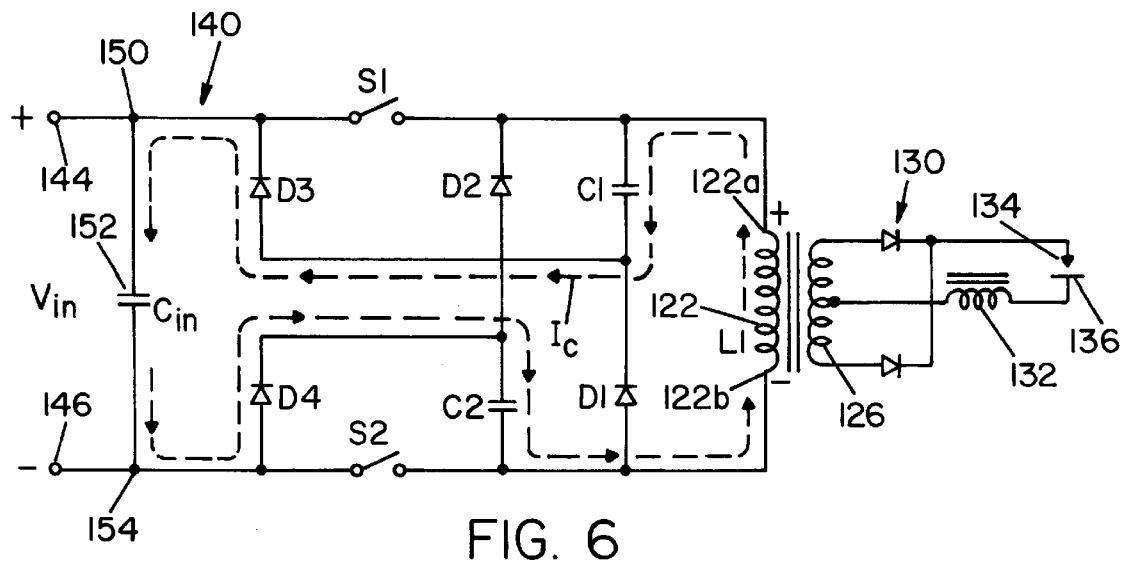

Welder B as shown in FIG. 3 is equiped with the improvement of the present invention wherein output transformer 120 has primary winding sections 122, 124 labeled as L1, L2, respectively. Secondary winding 126 is the input of rectifier 130 having an output for directing current through choke or inductor 132 and across electrodes 134, 136 in the welder. As in FIG. 1, welder B has a first stage 140 and a second stage 142 with both stages being essentially the same; therefore, only stage 140 will be described in detail. This stage includes a DC power source with a positive terminal 144 and a negative terminal 146. Tandem switches S1, S2 which are either a single switch or two switches are used to cause a current pulse to flow through winding 122. Switches S1, S2 operate in unison at a high speed, which rate is normally about 20 kHz or higher. The duty cycle of these switches controls the output current of the welder in accordance with standard practice. In accordance with the invention, snubber network S includes two storage capacitors C1, C2 connected in a diode controlled charging circuit including series diodes D1, D2. The charging circuit causes current to flow from end 122$b$ of winding 122 when switches S1, S2 are opened. Thus, capacitors C1, C2 are charged in parallel when a positive high voltage appears at end 122$b$ of winding 122. Diode D3 clamps end 122$b$ to positive terminal 150 of filter capacitor 152 through diodes D1/D3. Capacitor 152 is relatively large and acts as a constant voltage source. In a like manner, diode D4 clamps end 122$a$ to the negative terminal 154 through diode D2. The general operation of the preferred embodiment of the invention is illustrated in FIGS. 4–6 for a single stage 140. Referring now to FIG. 4, with tandem switches S1, S2 closed, current $I_O$ flows through winding 122 to create a current pulse in secondary winding 126, which current pulse has a width determined by the time switches S1, S2 are closed. When switches S1, S2 are opened, the voltage across inductor L1 reverses and a high positive voltage appears at lower end 122$b$. As shown in FIG. 5, current I continues to flow through inductor L1 and into branches $I_a$ and $I_b$ to charge capacitors C1, C2 toward the input voltage $V_{in}$. When the voltage on line 122$b$ is greater than $V_{in}$ by two diode drops, capacitors C1, C2 are fully charged. Remaining charge or energy is directed through diode D3 to terminal 150 of capacitor 152. Consequently, diode D3 clamps the voltage at 122$b$ to the positive voltage at terminal 150 as it appears across filter 152. Capacitors C1, C2 are charged when current flows as indicated in FIG. 5; however, these capacitors together with the leakage inductance of winding 122 creates a tank circuit having a natural frequency determined by the size of capacitors C1, C2 and the leakage inductance of winding 122. After current flows, as shown in FIG. 5 to charge capacitors C1, C2, the tank circuit of the voltage across winding 122 starts to decay. This reverse biases diodes D1, D2 to prevent discharge of capacitors C1, C2. However, diode D3 and D4 create a discharge path as indicated in FIG. 6 where current $I_c$ discharges capacitors C1,C2 in series. The capacitors C1, C2 were charged in parallel to the input voltage, thus the capacitors have twice the voltage $V_{in}$ when in series. The energy stored in capacitors C1, C2 is pumped back into the input filter 152 by the high voltage phenomenon. Discharging of capacitors C1, C2 by the path of current $I_c$, as illustrated in FIG. 6, continues until the current in the discharge circuit reaches zero when the voltage across winding 122 is balanced with the voltage across capacitor 152. When current $I_c$ is zero, diodes D3, D4 are reverse biased to block charge to the storage capacitors. Thus, energy transferred from winding 122 to storage capacitor C1, C2 is transferred to the input capacitor 152. This all occurs in a very short period of time, which time is less than the minimum off time of tandem switches S1, S2. The switches are now reset for subsequent closing to create another current pulse in winding 122 and reactivate the snubber protection awaiting opening of tandem switches S1, S2.

In FIG. 3, the important components of the preferred embodiment are:

$C_1=C_2=C_3=C_4=0.022$ μF

D1 to D8—are 25 amp/600 volts diodes $C_{in1}=C_{in2}=1600$ μF $L_1=L_2=20$ μH

Figure 9:
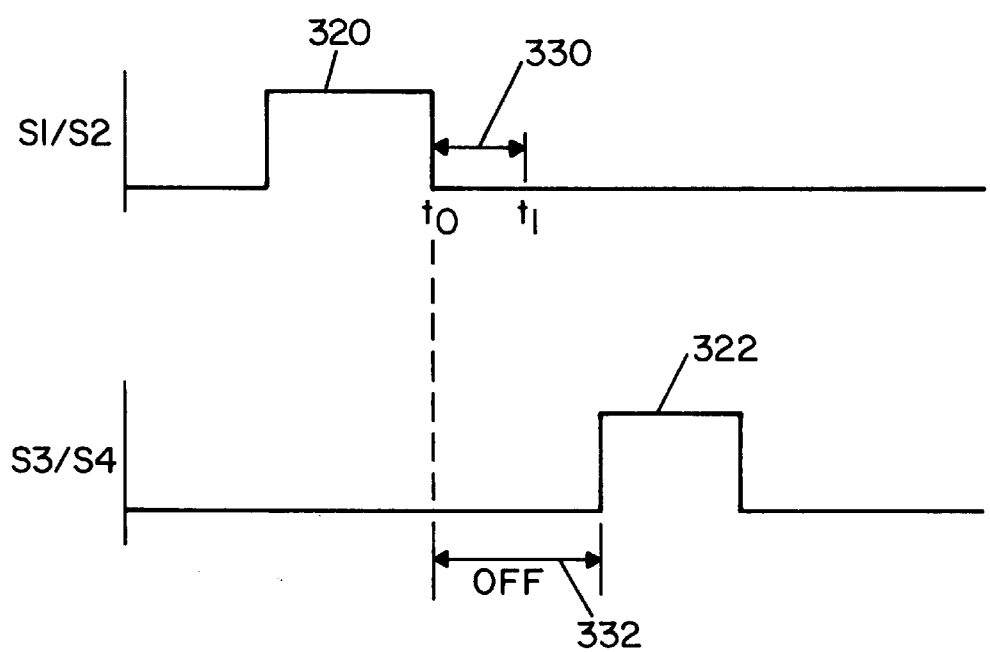
FIG. 9 are curves showing the current pulses when closing tandem switches during one stage and then closing the tandem switches in the other stage of the preferred embodiment illustrated in FIG. 3; and, FIG. 10 is a graph illustrating wave forms for certain currents and voltages of the primary winding and the storage capacitors of the preferred embodiment of the present invention; and, FIG. 11 is a wiring diagram of a full bridge, high speed inverter modified to include the present invention.

The resonant period $t_0$–$t_1$ for charging and then discharging capacitors C1, C2 is expressed by the formula:

$$\pi\sqrt{2}\,LC$$

Wherein L is the leakage inductance of the transformer winding and C is the capacitance of capacitor C1 or capacitor C2. This time is less than the period of the switches, as shown in FIG. 9.

The basic function of snubber S is to clamp the reverse voltage overshoot of winding 122 by transferring the electromagnetic energy due to the transformer leakage inductance to a capacitor at the moment switches S1, S2 are turned off. The leakage inductance of the transformer is the resonant element that fully discharges capacitors C1, C2 and transfers the energy back to the DC input. Capacitors C1, C2 start to absorb energy from winding 122 when switches S1 and S2 are turned off and the voltage across the winding 122 reverses. Diodes D1 and D2 are forward biased and provide parallel charging paths for capacitor C1,C2. When the current through winding 122 reaches zero, the voltage starts to decay and diodes D1 and D2 are reverse biased. This is the fully charged condition of capacitors C1,C2. They can not be charged further in the switch off condition. All energy from the transformer is transferred to capacitors C1, C2 or clamped back to the input filter capacitor. To prevent voltage overshoot of winding section 122, capacitance C of capacitors C1, C2 should be selected to have the maximum voltage on the capacitors equal to the input voltage $V_{in}$. If the capacitance of the capacitors is not large enough, the voltage on the capacitors does not exceed $V_{in}$ and diodes D3 and D4 are not forward biased. Energy is not transferred from end 122b to positive terminal 150 of filter capacitor 152. In practice, it is desired that there is a clamping action by diodes D3 and D4 so the charge and discharge time is short enough. Thus, the capacitance of capacitors C1, C2 is reduced to assure that the voltage on the capacitors tends to exceed $V_{in}$ so a certain amount of energy is transferred from winding 122 to capacitor 150 through diodes D3 and D4. When the voltage on winding 122 starts to decay capacitors C1, C2 are discharged through a discharge circuit including diodes D3 and D4 so that the input filter 152 and winding 122 are in series. The timing of this shift between the charging circuit and the discharging circuit is controlled by the resonant frequency of capacitors C1, C2 and leakage inductance L1. For the first 90°, the charging circuit is active. Then the discharging circuit is activated by decreasing the voltage of winding 122. This tends to discharge capacitors C1, C2. At first, capacitors C1,C2 charge both L1 and $C_{in}$. When the polarity of the voltage on winding 122 rereverses, capacitors C1, C2 as well as the leakage inductance L1 are all discharged into the input capacitor 152. Thus, capacitors C1, C2 are fully discharged and no energy is left in L1. When the energy in L1 causes the current $I_c$ to reach zero, diodes D3 and D4 stop conducting and snubber S has reset awaiting the next closure of the switches S1 and S2 and then subsequent opening of the switches for reactivating the snubber. Ideally there is no current flow in stage 140 after the discharge cycle has stopped. All the energy has been discharged from the transformer leakage inductance to the input filter capacitor. The total charge on capacitors C1, C2 has discharged during time $t_2$–$t_1$, which time is substantially less than the minimum off time of the inverter switching period. This is necessary to have capacitors C1, C2 fully discharge before the tandem switches S1, S2 turn on. Of course, the slight overlap in this area will merely decrease the amount of energy transferred back to the input of the power supply.

Figure 7:
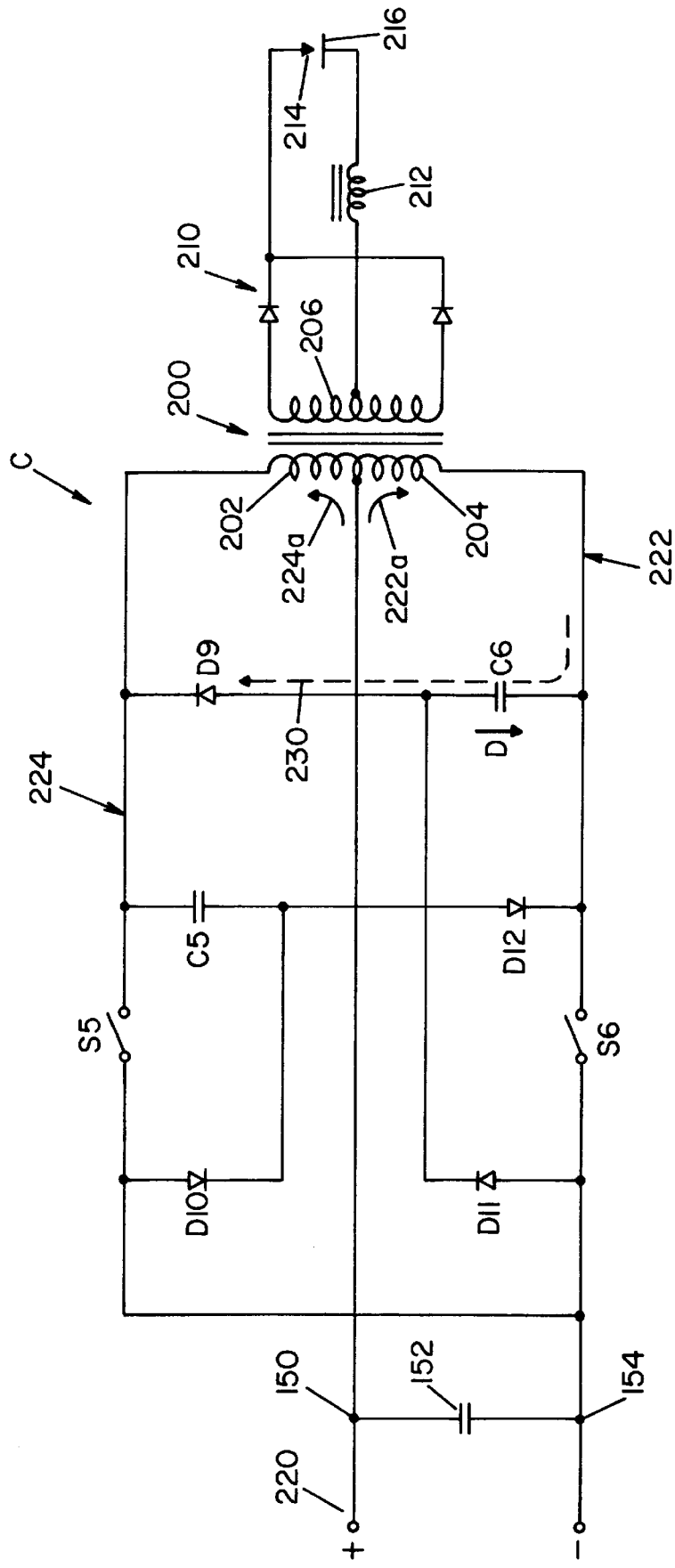
FIG. 7 is a wiring diagram of a push-pull, high speed switching inverter which may be used for arc welding and/or plasma cutting utilizing a modification of the preferred embodiment of the present invention.

Another embodiment of the present invention is illustrated in FIG. 7 wherein a push-pull high speed switching inverter C includes an output transformer 200 with primary winding sections 202, 204 and a secondary winding 206 connected to rectifier 210 for causing current flow through inductor 212 across electrode 214 and workpiece 216. Input DC power source 220 is a single stage, but the inverter has two switching stages 222, 224 for creating current pulses 222a, 224a, respectively when switch S5 and switch S6 are closed in sequence. Since the two stages are essentially the same, only stage 222 will be described in detail. This description will apply equally to stage 224. When switch S5 is open and switch S6 has been closed to create a current pulse, current flows as indicated by arrow 222a. Then, switch S6 is opened. This causes a reversal in winding 220 for charging capacitor C6 as indicated by the current flow 230. This current flow is allowed by diode D7. Since both sections 202, 204 of the primary winding are used to create the voltage for charging capacitor C6, the capacitor is charged to twice the voltage across input filter 152. Thus, the voltage across capacitor C6 is twice the input voltage allowing the reversal of current in windings 102, 104 to discharge capacitor C6 as indicated by the arrow D. Since capacitor C6 is charged to twice the input voltage or higher, the energy on capacitor C6 will discharge back into the input capacitor 152 through diode D9. Diode D7 is reverse biased when a voltage zero is clamped onto the top of winding 202. The leakage inductance of the windings serves as a resonant element to fully discharge capacitor C6 until a discharge current becomes zero. Then diode D9 becomes reverse biased and stops the ringing process. All the energy associated with the leakage inductance of transformer windings 202,204 is shifted or transferred back to the input source at the end of the snubber discharge cycle.

Figure 8:
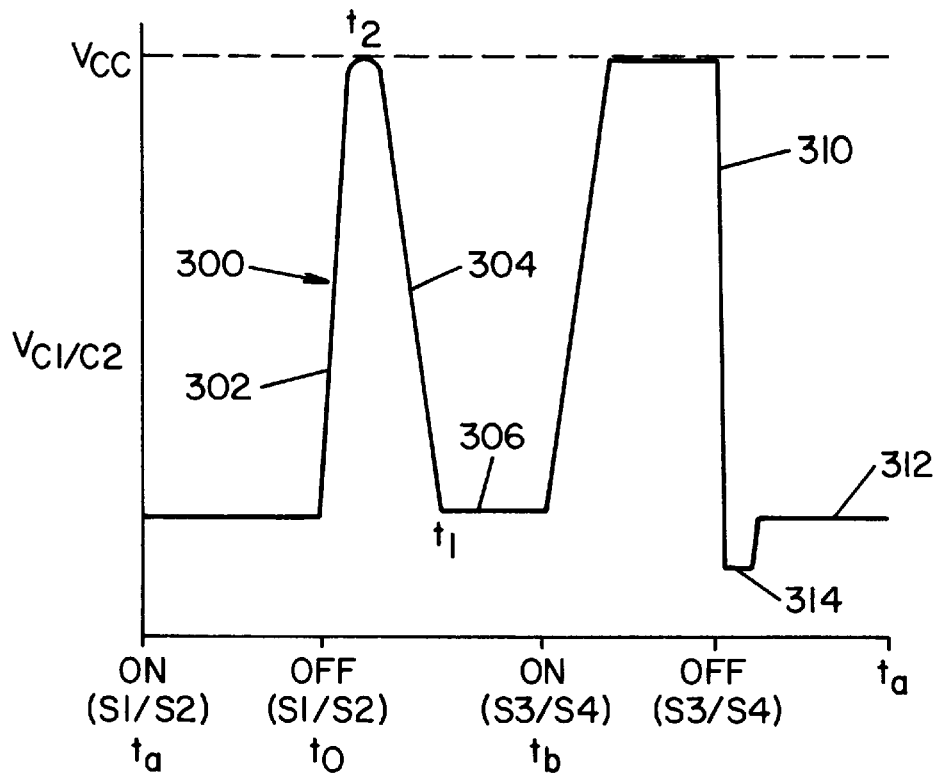
FIG. 8 is a graph showing the voltage on the storage capacitors during a single cycle of the switches in one stage of the preferred embodiment illustrated in FIG. 3.

The operation of welder B shown in FIG. 3 is schematically illustrated in FIG. 8 wherein the voltage across capacitors C1, C2 is represented by curve 300. At time $t_0$, switches S1 and S2 are open in unison. This causes the voltage across capacitors C1, C2 to rapidly increase as indicated by portion 302. At time $t_2$ the reverse voltage across winding 122 starts decaying to cause reverse bias of diodes D1, D2 and forward biasing of diodes D3 and D4. This causes a discharge along portion 304 to a set level 306, which level may not be the starting voltage of capacitors C1, C2. Thereafter, a voltage pulse 310 is caused by the application of current in the second stage 142. There is a residual voltage across the diode D1, D2 which is illustrated by portion 312. Slight increase of voltage on capacitors C1/C2 at portion 312 is due to reverse leakage recovery of diodes D3/D4 that leaves a small residual voltage on the capacitors. Before the diode recovery at portion 312, the capacitors fully discharge to level 314 for a short time. As illustrated in FIG. 9, current pulses 320 and 322 are the current pulses when closing the switches S1, S2 in stage 140 and then switches S3 and S4 in stage 142. This graph is used to illustrate that there is a time period 330 between time $t_0$ and $t_1$ where the capacitors C1, C2 are charged and discharged. This time period 330 is less than the switching period 332 during which both pairs of switches are off. Thus, capacitors C1, C2 can be fully charged awaiting discharge at a subsequent operation of switches S1, S2.

Figure 10:
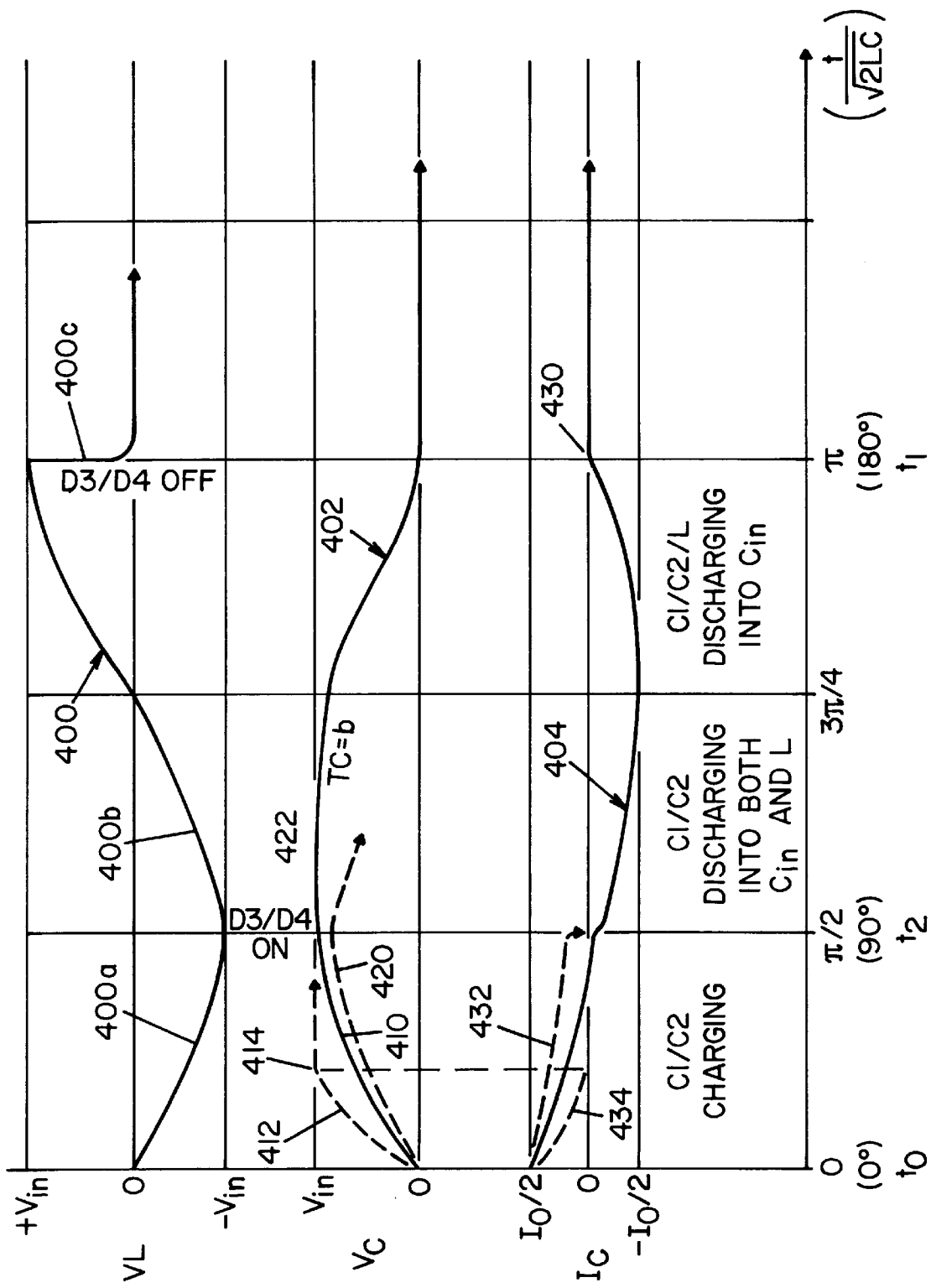

The general operation of the charging and discharging cycles for capacitors C1,C2 are schematically illustrated in FIG. 10. Graph 400 is the voltage across winding 122. Voltage across capacitors C1, C2 is represented by curve 402. The current flow to charge capacitors C1, C2 and discharge the capacitors C1, C2 is curve 404. These curves are representative in nature to illustrate generally the operating characteristics of snubber S as shown in FIG. 3. Between time $t_0$ and time $t_2$ the capacitors are charged as indicated by portion 410 and the voltage on winding 122 reverses as shown in portion 400a. At time $t_2$ which is 90° in the resonant voltage curve, the voltage across winding section 122 starts to decay as shown in portion 400b. When the decay starts, the discharge cycle commences at time $t_2$. This turns on diodes D3 and D4. Curve 410 indicates that capacitors C1 and C2 are fully charged to voltage $V_{in}$ at the moment of discharge. This is not necessarily the case. As indicated by graph 412, if the capacitance of capacitors C1, C2 is relatively low, they are fully charged to the input voltage at point 414. Thereafter, they are held at this voltage until the discharge cycle is initiated by a decay of voltage on winding 122 as represented by portion 400b. If the capacitance of capacitors C1, C2 is large, the capacitors are charged along line 420. At time $t_2$ the capacitors are not fully charged to the input voltage as indicated by point 422. Thus, it is desired that the capacitors have a low capacitance so that they are fully charged causing diodes D3 and D4 to clamp winding section 122 to input capacitor 150. The difference between the slope of the charging curve 410 for capacitors C1, C2 and the discharging curve shown as the remainder of curve 402 is due to the difference in the time constants indicated as $TC_a$ and $TC_b$. During charging of the capacitors, they are in parallel to give a slower rate. When being discharged, the capacitors are connected in series giving a rapid curve. The current for charging and discharging the capacitors is represented by line 404 which terminates at point 430 when the storage capacitors are fully discharged and the current drops to zero as shown by the voltage drop 400c of curve 400. The high capacitance causes a current to shift along line 432. A low capacitance causes the current to shift along a line 434. These curves are charging currents and do not affect the discharge wave current. At point $t_1$ the discharge current is zero and diodes D3 and D4 are reverse biased and turned off. Thereafter, the snubber awaits the next charge and discharge procedure.

Figure 11:
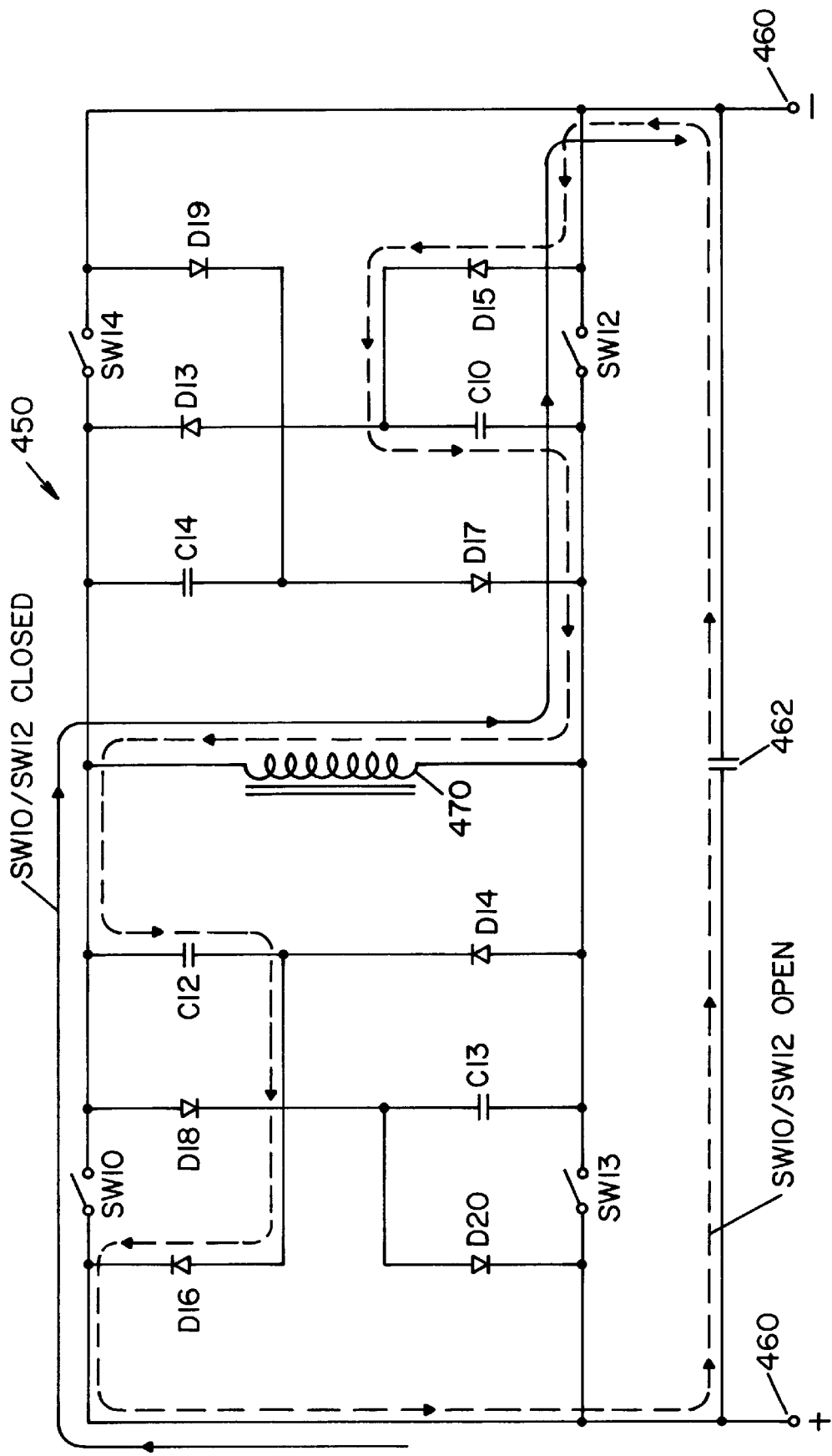

The invention has also been used in a full bridge inverter 450 as shown in FIG. 11 where the first switch is a set of tandem switches SW10/SW12 for passing current fro DC power source 460 having a filter capacitor 462 through the primary winding 470 of a load transformer as output transformer 120 in FIG. 1. The opposite polarity of current is caused in winding 470 by closing a switch in the form of a set of tandem switches SW13/SW14. When switches SW10/SW12 are closed current flows in a path as indicated by the solid line with arrows. When switches SW1/SW2 are open, capacitors C10 and C12 are charged in parallel through forward biased diodes D10/D11. After winding 470 starts to pass current in the reverse direction, capacitors C1 and C2 start to conduct current in the discharge reverse direction to reverse bias diodes D10/D11 and cause a discharge current flow as indicated in the dashed line through diode D12, capacitor C10, winding 470, capacitor C12, diode D13 to filter capacitor 462. Capacitors C11 and C12 are fully discharged. Then the winding 470 is subjected to a current pulse by closing the switch in the form of a set of tandem switches SW13/SW14. During this cycle of inverter 450, capacitors C13/C14 are charged in parallel through series diodes D14/D15 and are then discharged in series through diodes D16/D17. This embodiment of the invention operates in a manner similar to the inverter of FIG. 1.

Having thus defined the invention, the following is claimed:

1. In a switching type power supply for use in an electric arc welder or plasma cutter, said power supply comprising an output transformer with a primary winding in a series circuit including a DC source having a selected input voltage and a switch with a conductive on state to pass a current pulse through said primary winding in a first electrical direction and a non-conductive off state disconnecting said DC voltage source from said winding and a large filter capacitor across said DC input voltage source, said switch being operated at a radio frequency with a known period of said off state, the improvement comprising: a snubber network for transferring energy due to the leakage inductance of said winding to said filter capacitor when said switch is shifted from said on state to said off state, said snubber network including a storage capacitor with a diode controlled resonant charging circuit wherein said winding is in a tank circuit with said storage capacitor to charge said storage capacitor in a charging cycle when said switch shifts from said on state to said off state and said winding has a first electrical polarity, and a diode controlled discharging circuit with said storage capacitor in series with said winding and said filter capacitor to discharge said storage capacitor into said filter capacitor when said winding reverses said polarity, the time of successive charging and discharging cycles being less than said known period.

2. The improvement as defined in claim 1 including means in said diode controlled resonant charging circuit for charging said storage capacitor to a voltage level sufficient to create a capacitor discharge voltage greater than said selected input voltage at the start of said discharge cycle.

3. The improvement as defined in claim 2 wherein said voltage level is no greater than about twice said selected input voltage.

4. The improvement as defined in claim 2 wherein said voltage level is generally twice said selected input voltage.

5. The improvement as defined in claim 4 wherein said storage capacitor is two separate capacitors connected to be charged in parallel by said diode controlled resonant charging circuit and discharged in series by said diode controlled discharging circuit.

6. The improvement as defined in claim 5 wherein said diode controlled resonant charging circuit charges each of said capacitors to about said selected input voltage.

7. The improvement as defined in claim 2 wherein said storage capacitor is two separate capacitors connected to be charged in parallel by said diode controlled resonant charging circuit and discharged in series by said diode controlled discharging circuit.

8. The improvement as defined in claim 7 wherein said diode controlled resonant charging circuit charges each of said capacitors to about said selected input voltage.

9. The improvement as defined in claim 1 wherein said storage capacitor is two separate capacitors connected to be charged in parallel by said diode controlled resonant charging circuit and discharged in series by said diode controlled discharging circuit.

10. The improvement as defined in claim 9 wherein said diode controlled resonant charging circuit charges each of said capacitors to about said selected input voltage.

11. The improvement as defined in claim 5 wherein said capacitors have a capacitance of less than about 1.0 $\mu$F and said filter capacitor has a capacitance of at least about 1000 $\mu$F.

12. The improvement as defined in claim 11 wherein said leakage inductance is at least about 10 $\mu$H.

13. The improvement as defined in claim 12 wherein said selected input voltage is greater than 100 volts DC.

14. The improvement as defined in claim 5 wherein said capacitors have a capacitance of less than about 1.0 $\mu$F and said filter capacitor has a capacitance of at least about 1000 $\mu$F.

15. The improvement as defined in claim 14 wherein said leakage inductance is at least about 10 $\mu$H.

16. The improvement as defined in claim 15 wherein said selected input voltage is greater than 100 volts DC.

17. The improvement as defined in claim 1 wherein said capacitors have a capacitance of less than about 1.0 $\mu$F and said filter capacitor has a capacitance of at least about 1000 $\mu$F.

18. The improvement as defined in claim 11 wherein said selected input voltage is greater than 100 volts DC.

19. The improvement as defined in claim 2 wherein said selected input voltage is greater than 100 volts DC.

20. The improvement as defined in claim 1 wherein said selected input voltage is greater than 100 volts DC.

21. The improvement as defined in claim 2 wherein said storage capacitor is a single capacitor connected to be charged in series by said diode controlled resonant charging circuit and discharged in series by said diode controlled discharging circuit.

22. The improvement as defined in claim 1 wherein said storage capacitor is a single capacitor connected to be charged in series by said diode controlled resonant charging circuit and discharged in series by said diode controlled discharging circuit.

23. The improvement as defined in claim 5 including a diode connected to said diode controlled resonant charging circuit for clamping the high voltage end of said winding at the shift from the on state to the off state to the positive voltage side of said DC source.

24. The improvement as defined in claim 23 wherein the capacitance of said storage capacitor is at a value where said storage capacitor will be fully charged before said voltage at said high voltage end is clamped to said selected input voltage.

25. The improvement as defined in claim 24 wherein said storage capacitor is two separate capacitors connected to be charged in parallel by said diode controlled resonant charging circuit and discharged in series by said diode controlled discharging circuit.

26. The improvement as defined in claim 2 including a diode connected to said diode controlled resonant charging circuit for clamping the high voltage end of said winding at the shift from the on state to the off state to the positive voltage side of said DC source.

27. The improvement as defined in claim 26 wherein the capacitance of said storage capacitor is at a value where said storage capacitor will be fully charged before said voltage at said high voltage end is clamped to said selected input voltage.

28. The improvement as defined in claim 1 including a diode connected to said diode controlled resonant charging circuit for clamping the high voltage end of said winding at the shift from the on state to the off state to the positive voltage side of said DC source.

29. The improvement as defined in claim 28 wherein the capacitance of said storage capacitor is at a value where said storage capacitor will be fully charged before said voltage at said high voltage end is clamped to said selected input voltage.

30. The improvement as defined in claim 5 wherein said radio frequency is at least about 20 kHz.

31. The improvement as defined in claim 2 wherein said radio frequency is at least about 20 kHz.

32. The improvement as defined in claim 1 wherein said radio frequency is at least about 20 kHz.

33. The improvement as defined in claim 5 wherein said switch includes a first switch associated with one end of said winding and a second switch associated with the other end of said winding, said first switch and said second switch operating in unison.

34. The improvement as defined in claim 2 wherein said switch includes a first switch associated with one end of said winding and a second switch associated with the other end of said winding, said first switch and said second switch operating in unison.

35. The improvement as defined in claim 1 wherein said switch includes a first switch associated with one end of said winding and a second switch associated with the other end of said winding, said first switch and said second switch operating in unison.

36. In a switching type power supply for use in an electric arc welder or plasma cutter, said power supply comprising an output transformer with a primary winding in a series circuit including a DC source having a selected input voltage and a switch with a conductive on state to pass a current pulse through said primary winding in a first electrical direction and a non-conductive off state disconnecting said DC voltage source from said winding and a large filer capacitor across said DC input voltage source, said switch being operated at a radio frequency with a known period of said off state, the improvement comprising: a snubber network for transferring energy due to the leakage inductance of said winding to said filter capacitor when said switch is shifted from said on state to said off state, said snubber network including first and second storage capacitors with a diode controlled resonant charging circuit wherein said winding is in a tank circuit with said first and second storage capacitors connected in parallel with series diodes to charge said storage capacitors in a charging cycle when said switch shifts from said on state to said off state and said winding has a first electrical polarity, and a diode controlled discharging circuit with said first and second storage capacitors in series with said winding and said filter capacitor to discharge said storage capacitor into said filter capacitor when said winding reverses said polarity, the time of successive charging and discharging cycles being less than said known period.

37. The improvement as defined in claim 36 including means in said diode controlled resonant charging circuit for charging said storage capacitors to about said selected input voltage.

38. The improvement as defined in claim 37 including a diode connected to said diode controlled resonant charging circuit for clamping the high voltage end of said winding at the shift from the on state to the off state to the positive voltage side of said DC source.

39. The improvement as defined in claim 36 including a diode connected to said diode controlled resonant charging circuit for clamping the high voltage end of said winding at the shift from the on state to the off state to the positive voltage side of said DC source.

40. The improvement as defined in claim 37 wherein said power supply has an input current at said DC input voltage source in the range of 20–200 amperes.

41. The improvement as defined in claim 36 wherein said switch includes a first switch associated with one end of said winding and a second switch associated with the other end of said winding, said first switch and said second switch operating in unison.

42. A power supply for over 500 watts, said power supply having an output transformer with first and second primary windings, each of said windings being in a series circuit including a DC source having a selected voltage and a switch in the form of two switches operated in unison to have a conductive on state to pass a current pulse through said primary winding in a first electrical direction and a non-conductive off state disconnecting said DC voltage source from said winding and a large filter capacitor across said DC input voltage source, said power supply further comprising a snubber network for each of said windings to transfer energy due to the leakage inductance of the winding to said filter capacitor associated with the windings when said switches associated with the windings are shifted from said on state to said off state, said snubber network for each winding including first and second storage capacitors with a diode controlled resonant charging circuit wherein said winding is in a tank circuit with the storage capacitors to charge said storage capacitors in parallel in a charging cycle when said switches shift from said on state to said off state, and a diode controlled discharging circuit with said storage capacitors connected in series with said winding and said filter capacitor to discharge said storage capacitors into said filter capacitor when said winding reverses said polarity, the time of successive charging and discharging cycles being less than said known period, and means for first passing a current pulse in a first direction through said first winding and then passing a current pulse through said second winding in a second direction to create an AC output for said power supply.

\* \* \* \* \*